United States Patent [19]

Barth

[11] 4,003,315
[45] Jan. 18, 1977

[54] CONVEYOR CARRIAGE AND LADING SUPPORTING RACK

[76] Inventor: C. Richard Barth, 2908 Rockbrook Drive, Plano, Tex. 75074

[22] Filed: June 19, 1975

[21] Appl. No.: 588,512

[52] U.S. Cl. .................................. 104/93; 105/156; 198/797; 198/652; 211/94; 211/100; 248/294
[51] Int. Cl.² .................... B61B 3/00; B65G 17/16; B65G 17/24; B65G 17/34
[58] Field of Search ................. 104/88, 91, 93, 89; 105/150, 156, 153; 198/131, 154, 158, 177 R; 211/1.5, 94, 99, 100, 118, 178; 248/291, 294

[56] References Cited
UNITED STATES PATENTS

| | | | |
|---|---|---|---|
| 1,128,938 | 2/1915 | Boudreaux | 211/94 X |
| 1,454,675 | 5/1923 | Gantvoort | 104/91 X |
| 1,550,248 | 8/1925 | Gehnrich | 198/158 |
| 2,017,404 | 10/1935 | Lorig | 104/93 |
| 2,471,347 | 5/1949 | Rayburn | 105/156 X |
| 2,479,680 | 8/1949 | Hamilton, Jr. | 198/177 R |
| 2,967,081 | 1/1961 | Kleinpenning | 211/1.5 X |
| 3,139,966 | 7/1964 | Sheets et al. | 104/88 X |
| 3,338,420 | 8/1967 | McClenny et al. | 211/1.5 |
| 3,368,688 | 2/1968 | Weiss et al. | 198/177 R X |

Primary Examiner—Robert J. Spar
Assistant Examiner—Howard Beltran
Attorney, Agent, or Firm—James M. Peppers; Wayland D. Keith

[57] ABSTRACT

A support rack for handling packaged goods in conjunction with an overhead conveyor, such as a suspended monorail conveyor. An upright member has spaced apart, outstanding bars hingeable and detachably connected thereto to receive the goods to be moved, preferably packaged goods. Provision is made for attaching the entire unit to an overhead conveyor. The outstanding bars may be selectively hinged upward in the same plane and in aligned relation with respect to the upright support member to vary the space between the normally outwardly extending support bars to accommodate larger packages or goods of greater size, or all outwardly extending support bars may be hinged upwardly for greater convenience in handling and/or shipping. If used in a food processing plant, the outstanding bars may be readily removed for sterilization and quickly replaced. The material from which the unit is made may be rust proof metal, metal treated against rust or metal coated to prevent rust.

One form of the invention has the hingeably mounted support bars retained against removal from the support member.

5 Claims, 12 Drawing Figures

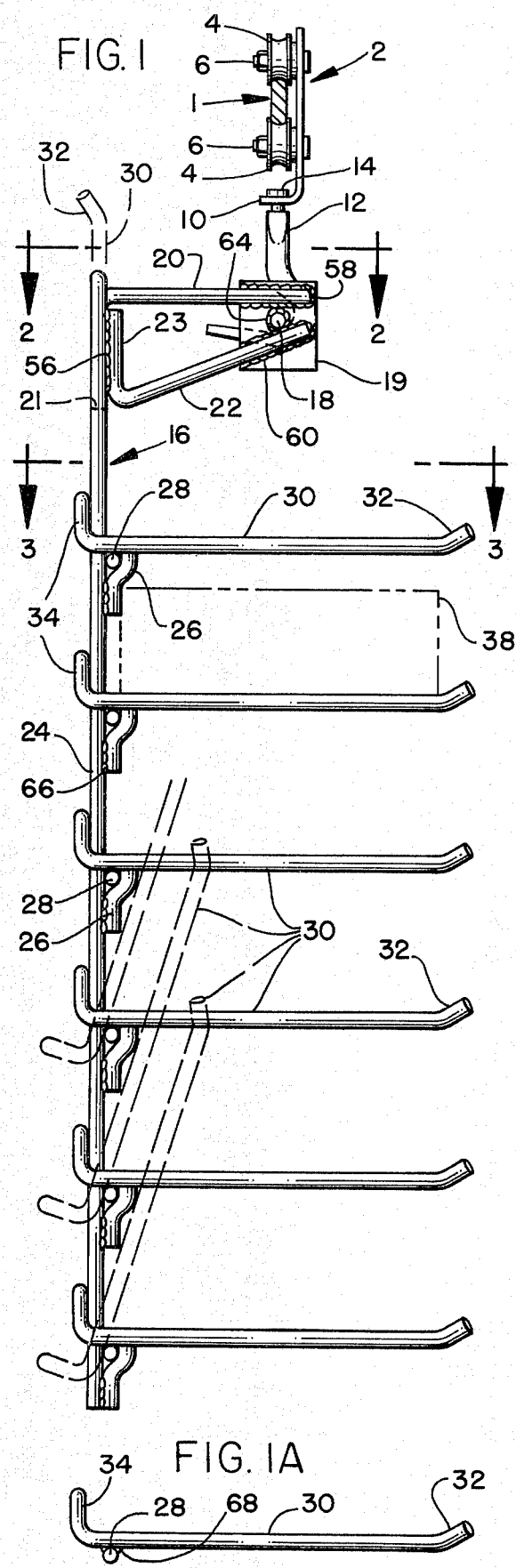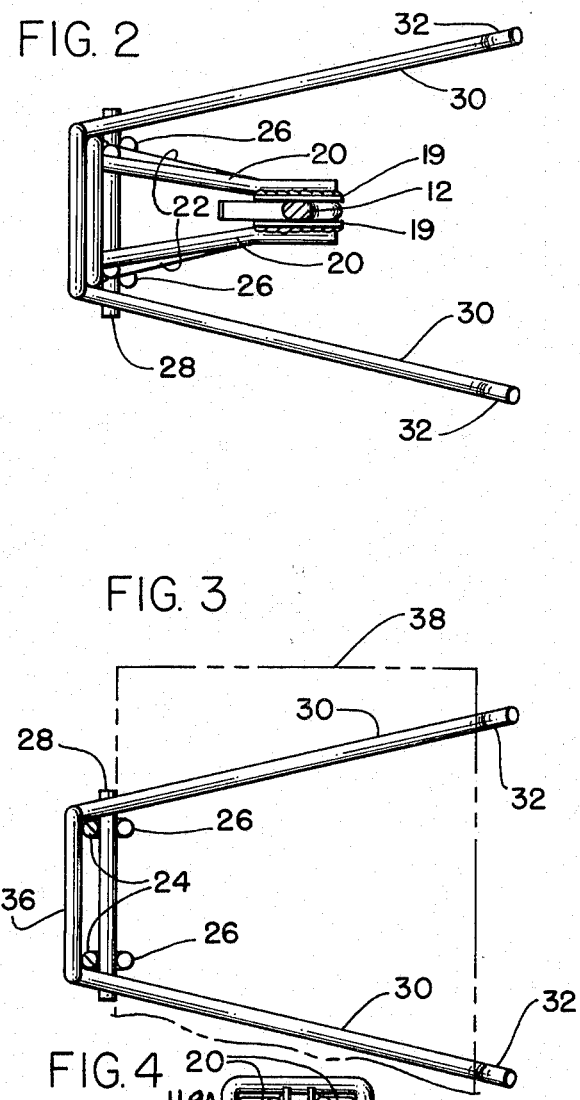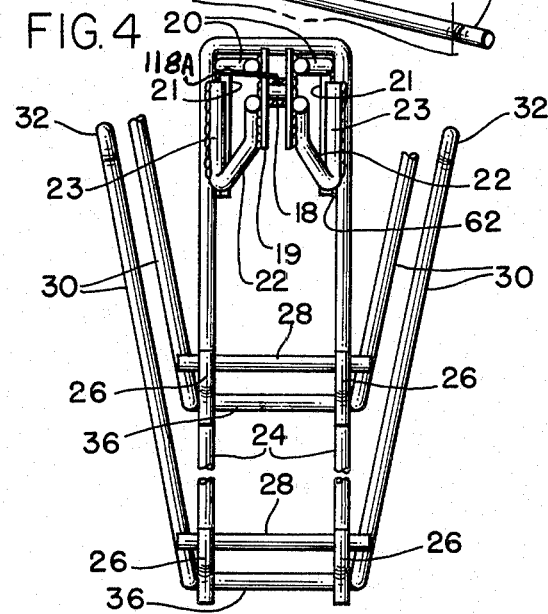

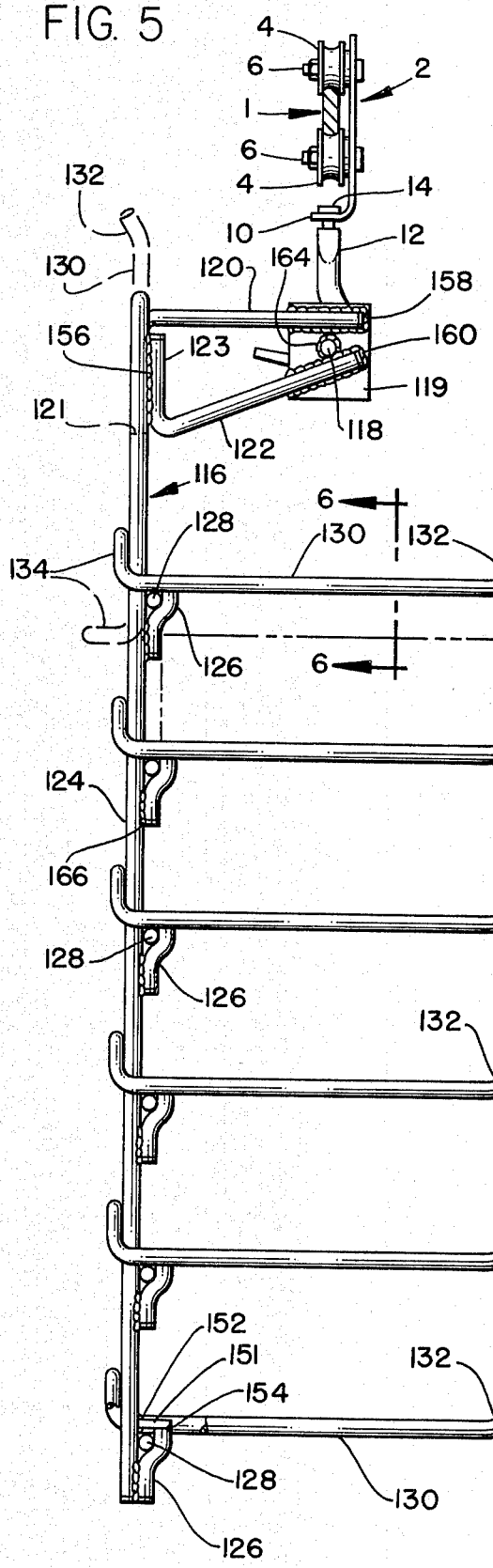
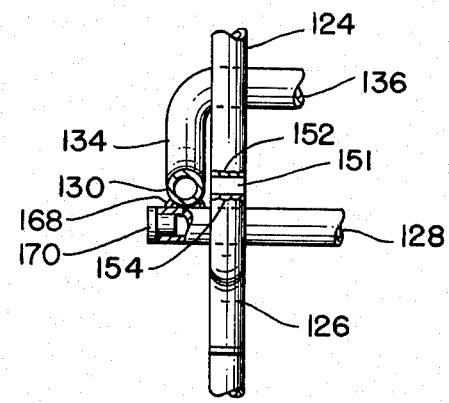
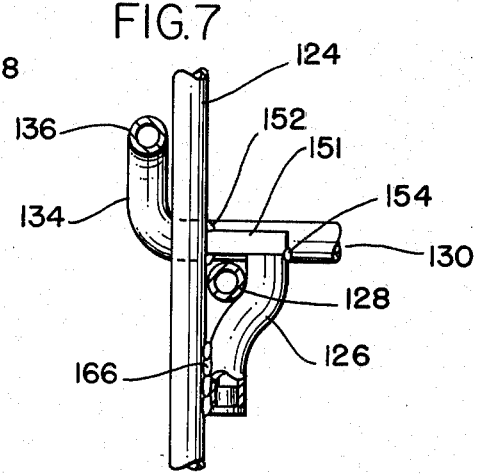
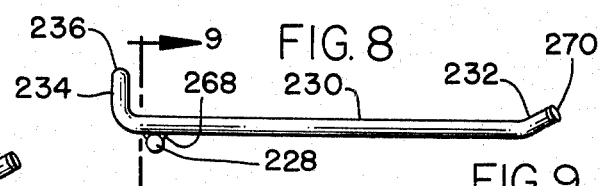
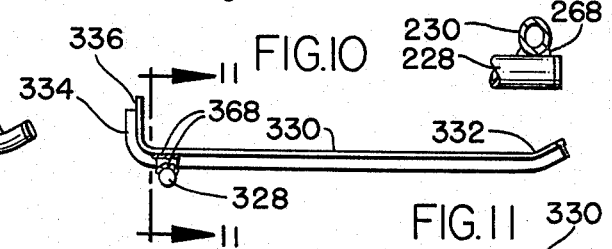
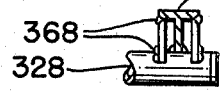

CONVEYOR CARRIAGE AND LADING SUPPORTING RACK

SUMMARY OF THE INVENTION

This invention relates to a carrier for use with an overhead conveyor to facilitate the handling of products, particularly packaged or boxed products. The conveyor may be a monorail conveyor and the carrier may be connected thereto by means of a swivel. Vertically spaced apart, outwardly extending support bars are attached to an upright support member, which member is attached to the conveyor. Boxes or packages are placed on the vertically spaced apart, outwardly extending support bars to be conveyed to a storage vault or to a place of unloading. For the handling of some merchandise, such as packaged meat, the carrier may be installed in a refrigerated vault, and the meat, which is normally boxed in sealed cartons, is placed on the carrier in such manner that the notations as to the contents and the date of packaging may be readily seen and the carrier so rotated on the conveyor to a specified location in the vault to allow for proper aging. The packages or boxes ready for distribution may be moved to a suitable place. In this manner a multiplicity of carriers may be used on a conveyor to meet a multiplicity of situations with a minimum of manual effort.

Furthermore, one form of the carrier provides for the removal of the V-shaped, outwardly extending support bar units from the carrier for sterilization and for shipping, or all the V-shaped bar units may be hingeably folded upward on the inverted, U-shaped member to occupy a minimum of space.

The units may be made of stainless steel, rust resistant material or the metal may be coated with plastic or the like to preclude rusting of the parts thereof.

The units may be made of solid rods, structural members, tubular members of various cross sections such as round and elliptical, to present great strength with a minimum of weight. Regarding material of the outwardly extending members are made of they are designated as bars.

PRIOR ART

The prior art has been searched and the following patents have been examined, which patents are not considered anticipatory of the present invention: U.S. Pat. Nos. 1,454,675, 2,479,680, 3,338,420, 1,550,248, 2,967,081, 3,368,688, 2,017,404, 3,139,966

BACKGROUND OF THE INVENTION

The handling of boxed meats or other packaged or boxed products on a monorail conveyor has heretofore lacked the flexibility of the present tiered carrier which can be suspended on a swivel member above the center of gravity so that the boxes or packages can be removed from the carrier from a side thereof. Also the boxes or packages may be readily moved from an upper tier to a lower tier so as to keep the packages which are ready for distribution at a convenient position for handling.

The outwardly extending support unit which forms a tier, may be selectively folded up to give greater space between tiers to accomodate boxes or packages of greater size. The construction is such that the outwardly extending bar units which form the tiers may be removed for cleaning and/or storage.

OBJECTS OF THE INVENTION

An object of this invention is to provide a tiered carrier for products, which carrier comprises horizontally and vertically spaced apart bars, to enable the tiered carriers to be moved along a conveyor.

Another object of the invention is to provide a wheeled carrier for a conveyor, which has outwardly extending and vertically spaced apart bars to enable products to be placed thereon for movement along a conveyor.

Still another object of the invention is to provide a wheeled carrier having an upright support member, for use on a conveyor, which carrier has normally outwardly extending, vertically spaced apart bars, which bars may be hinged to the support member so pairs of the bars will lie substantially in the same plane on the upright support member, when in one position.

A further object of the invention is to provide in an article carrier, an upright support member having a plurality of outwardly extending, vertically spaced apart support bars which may be selectively folded upwardly in parallel aligned relation with the upright support member so as to give a greater space between the outwardly extending bars, so as to accomodate packages of greater size.

Yet another object of the invention is to provide a wheeled carrier for use on a conveyor, which carrier has normally outwardly extending, vertically spaced apart support bars which are detachably connected to an upright support member, so the detachable bars may be readily removed for cleaning and readily replaced.

Still a further object of the invention is to provide a wheeled carrier for use on a conveyor, which carrier has normally outwardly extending, vertically spaced apart support bars which are detachably connected to an upright support member to enable the vertical height between the outwardly extending, vertically spaced apart support bars to be varied to accomodate loads of different dimensions.

Yet another object of the invention is to provide an upright support on which is mounted outwardly extending, vertically spaced apart bars, which bars receive boxed products therein in such manner that the containers may be labeled as to content, date of packaging and such other information as is necessary to properly classify the merchandise, which carrier may be turned so that the markings on the containers may be readily identifiable, and disposition made of the goods accordingly.

Still a further object of the invention is to provide, for an article carrier, an inverted U-shaped upright support member on which each upright portion is mounted vertically spaced apart, upwardly facing yokes, with the yokes on each upright portion forming transversely aligned pairs of yokes, with each pair of yokes to receive a transverse shaft therein, to which shaft is fixedly attached outwardly extending, V-shaped support members, which V-shaped support members can be moved to another position, about the axis of said shaft, so that the V-shaped support members will lie in the same plane as the upright support member, with the lower V-shaped support members being in overlapping relation to the V-shaped support member immediately thereabove.

Another object of the invention is to provide an outwardly extending bracket which has a support means thereon which is complementary with a support means on a conveyor so that the support means on the bracket will be aligned with the center of gravity of the carrier.

A further object of the invention is to provide a tiered carrier of which the outwardly extending bars are of tubular construction.

A still further object of the invention is to provide a tiered carrier of which the outward extending bars are of a structural shape.

BRIEF DESCRIPTION OF THE DRAWINGS

With these objects in mind and others which will become manifest as the description proceeds, reference is to be had to the accompanying drawings in which like reference characters designate like parts in the several views thereof, in which:

FIG. 1 is a side elevational view of a material carrier for a conveyor, showing an upright support member with outwardly extending support bars spaced apart vertically and hingeably and detachably connected to the upright support member, and showing an outwardly extending bracket with a load support member for complementary attachment to a support member on the conveyor so as to be substantially above the center of gravity of the load on the support bars;

FIG. 1A is a side elevational view of one of the outwardly extending support bars, shown apart from the support member;

FIG. 2 is a sectional view taken on the line 2—2 of FIG. 1, looking in the direction indicated by the arrows, and showing the top plan view of the upright, inverted, U-shaped support member to which outwardly extending, V-shaped support bars are hingeably connected for hinging into aligned relation with the upright support member or for removing from the upright support member;

FIG. 3 is a sectional view taken on the line 3—3 of FIG. 1, looking in the direction indicated by the arrows, showing the outwardly extending, V-shaped bars having the upstanding portion on the rear thereof in biased relation with the upright support member, and showing outwardly extending yokes secured to the upright support member to receive a shaft therein;

FIG. 4 is a fragmentary front elevational view, with the carrier being shown apart from the monorail, with parts being broken away and shortened to show the V-shaped bars in folded condition, with the V-shaped support bars being in substantially parallel aligned relation with the inverted, U-shaped, upright support member;

FIG. 5 is an upright side elevational view similar to FIG. 1 but of a modified form of the invention of tubular construction, with the upper end of the outwardly extending yokes closed to prevent removal of the hingeable, outstanding support bars, showing the upper-most support bar in substantially aligned relation with the inverted, U-shaped, upright support member; the bar upper end is shown in dashed outline;

FIG. 6 is a fragmentary sectional view, on an enlarged scale, taken substantially on the line 6—6 of FIG. 5, looking in the direction indicated by the arrows;

FIG. 7 is a fragmentary sectional view of a portion of the upright support member, showing a side elevational view of a yoke with a shaft therein and with a bar secured above the shaft to prevent removal of the outwardly extending, V-shaped support bar, but which will allow the outwardly extending support bar to be hinged into substantially upright, aligned relation with the upright support member in substantially the same manner as shown in FIG. 4;

FIG. 8 is a view similar to FIG. 1A but showing the outwardly extending bars to be tubular in construction;

FIG. 9 is a fragmentary sectional view taken on a section line 9—9 looking in the direction indicated by the arrows;

FIG. 10 is a view similar to FIG. 8 but showing the outwardly extending arms made of structural material which are tee members;

FIG. 11 is a fragmentary sectional view taken on a section line 11—11 looking in the direction indicated by the arrows and showing a tubular shaft secured thereto.

DESCRIPTION OF THE INVENTION

With more detailed reference to the drawings, the numeral 1 designates a suspended monorail conveyor having a roller carriage 2 thereon, which carriage rolls on wheels 4 over and below the monorail conveyor 1, which wheels are journaled on axes 6 mounted on the upright bar 8 of the carriage 2. The bar 8 has an inturned portion 10 beneath the monorail conveyor 1 to which a load bearing carrier or hook 12 is attached by pivot or swivel means 14 in such manner as to enable the tiered carriers, designated generally at 16, to be supported on bar 18.

The carrier 16 has the center of gravity directly below the pivot 14 and has a support member 18 to complementally engage the support member 12 on the roller carriage 2. The support member 18 is a pin which extends between a pair of spaced apart plates 19 to which the pin 18 is welded. The plates 19 are supported on outwardly extending brackets 20 and 22, which brackets are secured to an inverted, upright, U-shaped member 24. The braces 20 are welded to plates 19 and extend between portions of the inverted, U-shaped member 24 near the upper end thereof. The braces 20 have downturned ends 21 which are welded to the inner sides of the portions of the U-shaped member 24, as will best be seen in FIGS. 2 and 4.

The braces 22 are welded to spaced apart plates 19 and have the distal end portions 23 thereof upturned and welded along the adjacent side of each portion of the inverted, U-shaped, upright support member 24, as is best seen in FIG. 1.

The inverted, U-shaped, upright member 24 has spaced apart yokes 26 thereon and secured thereto in transverse aligned relation on one side of the respective upright bars 24 of the inverted, U-shaped, upright member 24. The yokes 26 are of a size to receive a transverse shaft 28 therein to support the shaft in a substantially horizontal position between each pair of yokes, as is best seen in FIG. 4.

Outwardly extending, V-shaped bar units 30 are fixedly secured, as by welding, on their lower sides to the transverse shaft 28, each which shaft is fitted within a pair of transversely aligned, spaced apart yokes 26 and is journaled therein adjacent the respective spaced apart, upright, members 24, which upright, inverted, U-shaped member is preferably made on a single piece of material, as will best be seen in FIGS. 1, 2, 4 and 5.

The outwardly extending bar units 30 are preferably upturned on the distal ends thereof, as indicated at 32 and each has an upturned portion 34, which has a portion 36 which extends transversely across the upright, U-shaped member 24 on the side thereof opposite the transverse shafts 28. The transverse portion 36 is supported or biased against the upright, U-shaped bars, when the support bar units 30 are in outwardly extending position. This gives rigidity to the V-shaped support bar units 30. The outwardly extending, V-shaped bar units 30 may be hinged upwardly until the bars lie in aligned relation with the inverted, U-shaped support member 24, so as to occupy a minimum of space for storage and shipment.

In the form of the invention as shown in FIGS. 1 through 4, the normally outwardly extending bar units 30 may be moved upwardly out of the yoke 26, which enables these V-shaped support bar units 30 to be moved upwardly into a position substantially as shown in dashed outline in FIG. 1, and when the shaft 28 of each is attached to the V-shaped bar unit 30 and moved upwardly and downwardly, the unit may be removed from the inverted, U-shaped, upright member 24, and with the normally outwardly extending support bar units 30 thus removed, the units may be readily packed for shipment, they may be sterilized in a relatively small vat, and reinserted into the yokes in inverse manner. The yokes are welded, as indicated at 27 to the upright support members 24.

In addition to being removable, the normally outwardly extending V-shaped support bar units may be selectively, for instance every other unit, may be hinged upwardly until the support bar unit is in aligned relation with the upright support member 24. In this manner larger boxes may be loaded between the outwardly extending V-shaped bar units 30.

While only six outwardly extending, V-shaped bar units 30 have been shown, in the present instance, any number of such units and any spacing may be provided so long as the distance between the supporting pin 18 and the floor level gives sufficient clearance for the carrier 16 to pass.

The tiered material carrier is particularly adaptable to conveying "boxed" meat, which boxes may be properly numbered and dated and the identifying data as to type meat within the container as the meat becomes aged it can be moved downward until it reaches the bottom tier, in this manner the meat may be properly aged in a refrigerated vault and be in position for unloading and shipping at the proper time. Furthermore, a plurality of tiered carriers may be mounted on the monorail, so either a certain cut of meat, such as shoulder, or hind quarter may be boxed and placed on individual tiered carriers, properly labeled with the identifying date, so it can be readily located and moved to the proper place, either to remain for ageing or to be unloaded for distribution.

The present device is particularly adaptable for use in refrigerated vaults, as it can be made of rust proof material or it can be coated with a plastic material or the like to prevent rust. In this manner any part or the entire carrier may be readily sterilized.

The normally outwardly extending V-shaped bar units as so arranged as to enable relatively long boxes 38 to be placed upon the outwardly extending V-shaped bar units 30 and be stabilized thereon and yet enable the bars to be folded upward in overlapping relation, as shown in FIG. 4, when the device is not in use.

SECOND FORM OF THE INVENTION

FIGS. 5 through 7 discloses a second form of the invention, the frame of which is substantially tubular construction; and performs the same functions as the aforementioned invention, that is, supporting boxed material being conveyed, such as meat, in a packing plant, and/or refrigeration vault.

A monorail conveyor designated generally at 1 has a wheeled carriage 2 thereon to which is attached a swiveled hook 12, which hook is of a character to permit the load supporting device 116, which forms the tiered carrier, to be readily attached thereto and detached therefrom. The load supporting device is designated generally by the numeral 116 and is preferably of tubular construction, which device is sufficiently light to enable one person to remove the device from the hook 2 and to replace it thereonto. The tubular material may be stainless steel, aluminum or the like so the load carrying device 116 can be easily maintained in a sterile condition.

It is preferable to have a series of these load supporting devices 116 on a monorail conveyor, such as now in conventional use, so as to minimize the work for the persons handling the material. The second form of the invention has outward extending tubular members 120 which forms a bracket. Each bracket is secured to upright tubular member 124 and to plate 119 as by welding. A tubular member 122 has a bent portion 123, which is secured to the tubular member 124 by a weld 156 and to the plate 119 by a weld 160 to form a rigid support for the upright load support device 116, which is the tiered carrier.

A pin 118 passes transversely through each plate 119 which plates are spaced apart and which receives a roller 118A on the pin between the plates to enable the upright support member 116 to be readily removed from or replaced onto hook 12. The tubular members are substantially the same configuration as the bars in the form of the invention as shown in FIGS. 1 through 4; and for sanitary reasons, each open end of each tube is plugged with plugs which are indicated at 170 in FIGS. 5, 6, and 7. The various parts are preferably welded together as indicated at 156, 158, 160, 166 and at 168. The form of the invention as shown in FIGS. 5, 6, and 7 is of light weight tubular construction and has the tubular bars thereon which normally supports the load, indicated at 130.

Each of the tubular member 130 which extends outwardly has a shaft 128 secured thereto as by welding as will best be seen in FIG. 6. Each shaft 128 is journaled within yoke 126, which yokes are secured in a transversely aligned relation on upright tubular members 124, which yokes 126 are also spaced apart vertically. In the second form of the invention the shaft 128 is retained in place by a bar 151 secured across the top of each said yoke as by welding as indicated in 152 and 154.

Each tubular member 130 has an upturned portion 134 which has a portion 136 connected thereto which extends transversely across tubes 124, so when in the full outline position, as indicated in FIGS. 5, 6 and 7, the outward extending tubular members 130 will be supported in horizontal relation. The outwardly extending tubular members diverge from a medial vertical plane so they can be moved upwardly in the same manner as the bars as shown in FIG. 4, to lie in the same plane, and as shown in dashed outline at the upper portion of FIG. 5. The distal end of each outwardly extending tubular member 130 preferably are upturned as indicated at 132 to prevent boxes 138 or the like from shifting off of the outer end of the tubular members 130. The outwardly extended tubular members 130 may be hinged upwardly lie in the same plane as indicated in dash outline in FIG. 5 to minimize the space for storage or shipment.

THIRD FORM OF THE INVENTION

The third form of the invention as shown in FIGS. 8 and 9 is substantially like the form of the invention as shown in FIG. 1A, except the outwardly extending bars 230 are elliptical tubular members, which form of the invention is used in connection with a monorail 1 having a wheeled carriage 2 thereon, which wheeled carriage supports a swiveled hook 12 in the same manner as shown in FIG. 5. The upright load supporting device is of the same construction as shown at 116 in FIG. 5 to support a tubular shaft 228 within outstanding yokes 126. The elliptical tubular members 230 are formed substantially in a V-shape in a manner similar to that shown in FIG. 4, and has outwardly diverging elliptical, tubular members 230 which are secured, as by welding, to the shaft 228 by welds 268. An upwardly extending portion 234 and transverse tubular portion 236 is biased against the rear side of the upright tubular member 124. The tubular member 230 is elliptical in shape so as to present the major axis thereof in a vertical plane.

The distal ends 232 of the tubular members 230 are upturned, the hollow ends thereof being plugged with plugs 270, as indicated in FIGS. 8 and 9. This construction allows greater loads, such as indicated at 138, to be carried on the elliptical tubular support bars 230 than on round bars or tubular members as shown in FIGS. 1 through 7.

FOURTH FORM OF THE INVENTION

The fourth form of the invention as shown in FIGS. 10 and 11 utilizes a structural member such as a structural tee member 330, which has a shaft 328 weldably secured thereto, which shaft will fit within a yoke such as indicated at 26 FIGS. 1 through 4 or 126 in FIG. 5 and 7.

The inner end of the support member has an upwardly extending portion 334 which interconnects with a transverse portion 336 to extend on the rear side of upright tubular members 124, FIGS. 5, 6, and 7, in biased relation so that when a load is placed on the outwardly extending bars 330, the stem of the tee will extend downwardly to give the maximum support with the minimum of weight. The distal ends of each of the bars 330 are upturned as indicated in 332 so as to prevent the loads, such as boxes 138, FIG. 5, from shifting off of the outer end thereof.

The outwardly extending bars 130, 230 and 330 can be used interchangeably on the upwardly extending inverted U-shape members 124 and the retainer bars 151 may be used on any form of the invention.

What is claimed is:

1. Apparatus adapted for transfer of products through stages of processing while allowing interim storage of such products including in combination:
    a. roller carriage means adapted to depend in a rolling relation from a conveyor track means;
    b. a vertical swivel means depending from said roller carriage means and supporting a hook means;
    c. a tiered carrier means including a support bar supported in readily removable relation from said hook means;
    d. a vertical support means including at least two vertically disposed and laterally spaced apart support members connected to a bracket means extending laterally from said support means into connection with said support bar with said support bar being mounted at substantially the horizontal center of gravity of said tiered carrier means to provide and maintain a substantial vertical posture of said tiered carrier means;
    e. a plurality of vertically spaced apart yokes mounted in transversely aligned relation to said vertically disposed support means;
    f. a plurality of support shafts each being received in and supported by at least two said transversely aligned yokes;
    g. at least two substantially horizontal support members connected to each said shaft to extend transversely from said vertically disposed support means; and
    h. said two horizontal support members being also connected to a positioning bias means which engages at least one of said vertical support members to support said horizontal support members in said horizontal position and adapted to allow the combination of said shaft and said horizontal support members to be pivoted upwardly then be readily removed from said tiered carrier such as for cleaning.

2. The apparatus of claim 1 wherein the distal ends of said horizontal support members diverge upwardly.

3. The apparatus of claim 1 wherein said horizontal support bars are connected in diverged position from each said support shaft to form a substantially V-shaped member.

4. The apparatus of claim 1 wherein said horizontal support members, said support shaft and said positioning bias means are connected to form structure which can be pivoted upwardly and removed as an integral unit.

5. The apparatus of claim 1 wherein: (a) the distal ends of said horizontal support members diverge upwardly; (b) said horizontal support bars are connected in diverged position from each said support shaft to form a substantially V-shaped member; and (c) said horizontal support members, said support shaft and said positioning bias means are connected to form structure which can be pivoted upwardly and removed as an integral unit.

* * * * *